United States Patent [19]

Mann

[11] 4,451,009

[45] May 29, 1984

[54] WINDING MECHANISM

[76] Inventor: John B. Mann, 41 Main St., Calverton, Nottingham, England

[21] Appl. No.: 336,480

[22] Filed: Dec. 31, 1981

[30] Foreign Application Priority Data

Jan. 3, 1981 [GB] United Kingdom ............... 8100048

[51] Int. Cl.³ ...................... B65H 77/00; B65H 79/00
[52] U.S. Cl. .............................................. 242/54 R
[58] Field of Search ................. 242/54 R, 49, 85, 189, 242/190, 191, 57, 84.1 A, 217, 75, 75.4; 192/14; 254/268, 266, 350, 376; 200/61.17; 360/74.2

[56] References Cited

U.S. PATENT DOCUMENTS

| | | | |
|---|---|---|---|
| 2,198,257 | 4/1940 | McMahon | 242/217 X |
| 2,259,206 | 10/1941 | Hopkins | 254/350 X |
| 2,325,885 | 8/1943 | Serrurier | 192/14 X |
| 2,514,402 | 7/1950 | Lyon | 200/61.17 X |
| 2,648,506 | 8/1953 | Kirby | 192/14 X |
| 3,207,451 | 9/1965 | Kane | 242/54 R |
| 3,690,591 | 9/1972 | Opelt | 242/190 X |
| 3,825,207 | 7/1974 | LaRue, Jr. | 200/61.17 X |

FOREIGN PATENT DOCUMENTS

178110  4/1923  United Kingdom ................ 254/350

Primary Examiner—Stuart S. Levy
Assistant Examiner—Scott J. Haugland
Attorney, Agent, or Firm—William A. Drucker

[57] ABSTRACT

The mechanism for cable winding comprises a drive means to a spindle carrying a cable reel, having a spur gear the output member of which is axially displaceable in relation to the input member while still permitting torque to be transmitted by the spur gear. The spur gear applies torque to the spindle via a slippable friction clutch the input member of which is biassed against the output member by axial displacement of a shaft carrying the output member of the spur gear; the shaft displacement being taken up by axial displacement of the output member. The spur gear is efficient in transmitting torque and avoids difficulties due to under or overheating of the lubricant. The clutch is a simple but convenient means of transmitting the torque delivered by the spur gear to the spindle.

36 Claims, 6 Drawing Figures

WINDING MECHANISM

FIELD OF THE INVENTION

The present invention relates to a winding mechanism for winding up things such as cables, ropes and hoses, hereinafter, for convenience, referred to as "cables".

BACKGROUND OF THE INVENTION

Such mechanisms commonly employ a worm and wheel drive to a winding member on which the cable is wound up. Infrequent use of the mechanism results in failure of the lubricant for the worm and wheel drive to reach its intended working temperature and this leads to inefficient operation of the mechanism. Notwithstanding this, frequent use may lead to overheating of the lubricant; making an arrangement for cooling it desirable. On the ground of cost, however, it is not feasible to do this.

OBJECTS OF THE INVENTION

It is an object of the present invention to provide a winding mechanism to avoid problems due to lubricant temperature. It is also an object of the present invention to provide a winding mechanism for winding up a cable, comprising drive means for applying torque to the winding member to rotate it to wind up the cable, using an efficient spur gear and a simple but efficacious slippable friction clutch for transmitting the torque to the winding member.

It is a further object of the invention to provide a winding mechanism in which torque is transmitted to a winding member through a slippable friction clutch having an input member and an output member one of which is relatively axially displaceable in relation to the other, and in which means are provided for biassing the displaceable clutch member against the other clutch member so as to compensate for clutch wear and sustain the capacity of the clutch to transmit torque.

It is a still further object of the invention to provide a winding mechanism having means for sensing the direction of rotation of the winding member to permit requisite control of drive to the winding member; the means responding to viscous lubricant drag between relatively rotating parts of the drive.

BRIEF SUMMARY OF THE INVENTION

The invention uses drive means for applying torque to the winding member to rotate the latter to wind up the cable, comprising a slippable friction clutch having a first member axially displaceable relative to a second member thereof, a gear wheel arrangement comprising driving gear wheel and, meshing therewith, a driven gear wheel; one of said gear wheels being axially displaceable in relation to the other said gear wheel while still permitting torque to be transmitted by the gear wheels, and the displaceable gear wheel being connected to the displaceable clutch member to rotate and to undergo axial displacement therewith; and means for effecting axial displacement of the displaceable clutch member relative to the other clutch member in order to maintain a driving connection between said clutch members. Little force is needed to cause axial displacement of the displaceable gear wheel and the gear arrangement therefore suffers no appreciable loss of efficiency due to the axial displacement. Yet it allows torque to be transmitted by the clutch, which latter provides a simple but efficacious means of controlling the torque to be applied to the winding member.

In a preferred embodiment, the displaceable clutch member is the clutch input member and the displaceable gear wheel is the driven one. In the preferred embodiment the clutch input member is mounted on an axially displaceable shaft with the second gear wheel being mounted on the shaft to effect rotation thereof. It is preferred that the shaft be directly supported by needle roller bearings; and it may be indirectly supported by ball bearings.

In the preferred embodiment of the present invention the means for effecting displacement of the clutch input member comprises a lever pivoted so that on pivoting of the lever one end thereof is translated generally in the direction of displacement of the clutch input member, and means for transmitting movement of that end of the lever in the direction towards the clutch output member, to the clutch input member. For the purpose of transmitting movement of said one end of the lever to the shaft and thereby to the clutch input member, the shaft may carry a thrust bearing to be acted against by the one end of the lever. Preferably, the lever is resiliently biassed to displace the clutch input member in the direction towards the clutch output member; and the resilient bias may be provided by one or more tension springs.

It is a feature of the invention to use, in association with the or each spring, means for maintaining the leverage exerted by the spring or springs with clutch wear so that the torque to be transmitted by the clutch is sustained. Preferably, the maintaining means comprises an operating lever having a cam surface, and being pivoted at one end and acting intermediate its ends by means of the cam surface on said lever of the displacement means at a location on the latter remote from said one end of that lever, and an actuating member through which spring tension can be applied to said operating lever at a predetermined lever arm; the arrangement being such that with clutch wear, the spring tension pivots the actuating member to pivot the operating lever to cause the cam surface thereof to displace the lever of the displacement means so that the lever arm exerted through the operating lever increases to maintain the capacity of the clutch to transmit torque.

It is also preferred that the actuating member be adjustable in position so that it can be adjusted to shorten or lengthen the spring extension and correspondingly the lever arm, whereby, for any given clutch wear condition, the maintaining means also constitutes a means to set a predetermined torque to be transmitted by the clutch i.e. by shortening or lengthening the spring extension and lever arm as the case may be. For this purpose, the maintaining means may comprise a manually settable displacement device for effecting adjustment of the position of the actuating member.

The actuating member may be in the form of a cranked lever to one end of which the or each spring is pivotally connected and the other end of which is pivotally connected to said displacement device; the lever having located intermediate its ends a bearing member to bear on and make displaceable contact with said operating lever, under the spring tension. The bearing member is preferably in the form of a roller to provide rolling contact between the bearing member and the operating lever. It is also preferred that the lever of the displacement means be guided at the end remote from said one end by a rectilinear guide, which may be in the form of a slot; and, in this case, it is preferred that the remote end of the lever of the displacement means be guided in the slot by means of a roller carried by the lever. It is also preferred that the operating lever act on the lever of the displacement means via a roller carried by the latter. The settable displacement device may comprise a screw supported in an axially fixed nut having a screw-threaded bore so that rotation of the nut and thereby of the screw-threaded bore displaces the screw axially, thereby to displace said actuating member.

It is also a feature of the invention to employ means for sensing the direction of rotation of said winding member and for providing a signal, hereinbelow called the stop signal, when and for as long as the direction is contrary to that of wind up, for stopping drive to the clutch input member; said means responding to viscous drag of lubricant.

The sensing means preferably comprises a displaceable member arranged in relation to a rotating part of said take-up and pay-off means so that rotation of said rotating part causes displacement in a given direction of said member by the effect thereon of the viscous drag of lubricant between the member and said rotating part; and it is also preferred that said member and said rotating part comprise an annular form and are arranged co-axially of one another. The displaceable member may comprise a vaned, radially extending paddle; the lubricant acting against the paddle to cause displacement of the member; or said rotating part and said member may provide opposed concentrically arranged circumferential surfaces spaced sufficiently closely so that lubricant drag between the rotating part and the member causes, on rotation of the rotating part, displacement of the member in the direction of rotation of the rotating part. In this case, it is preferred that the rotating part and the displaceable member be made of materials of different coefficients of thermal expansion so that the spacing between them varies inversely with the temperature to compensate for the changing viscosity of the lubricant with temperature.

The displaceable member may be linked to the actuator of a switch to operate the switch on displacement of the displaceable member to provide the stop signal; and the link is preferably resiliently biassed to assume a position out of contact with the switch actuator when the displaceable member has not been displaced.

The drive means preferably comprises a motive power unit in the form of an electrical motor having a control circuit arranged to prevent operation of the motor in response to said stop signal.

DETAILED DESCRIPTION OF THE INVENTION

The present invention will now be described with reference to the accompanying drawings illustrating, by way of example, an embodiment of the present invention. In the accompanying drawings.

Figure 1:
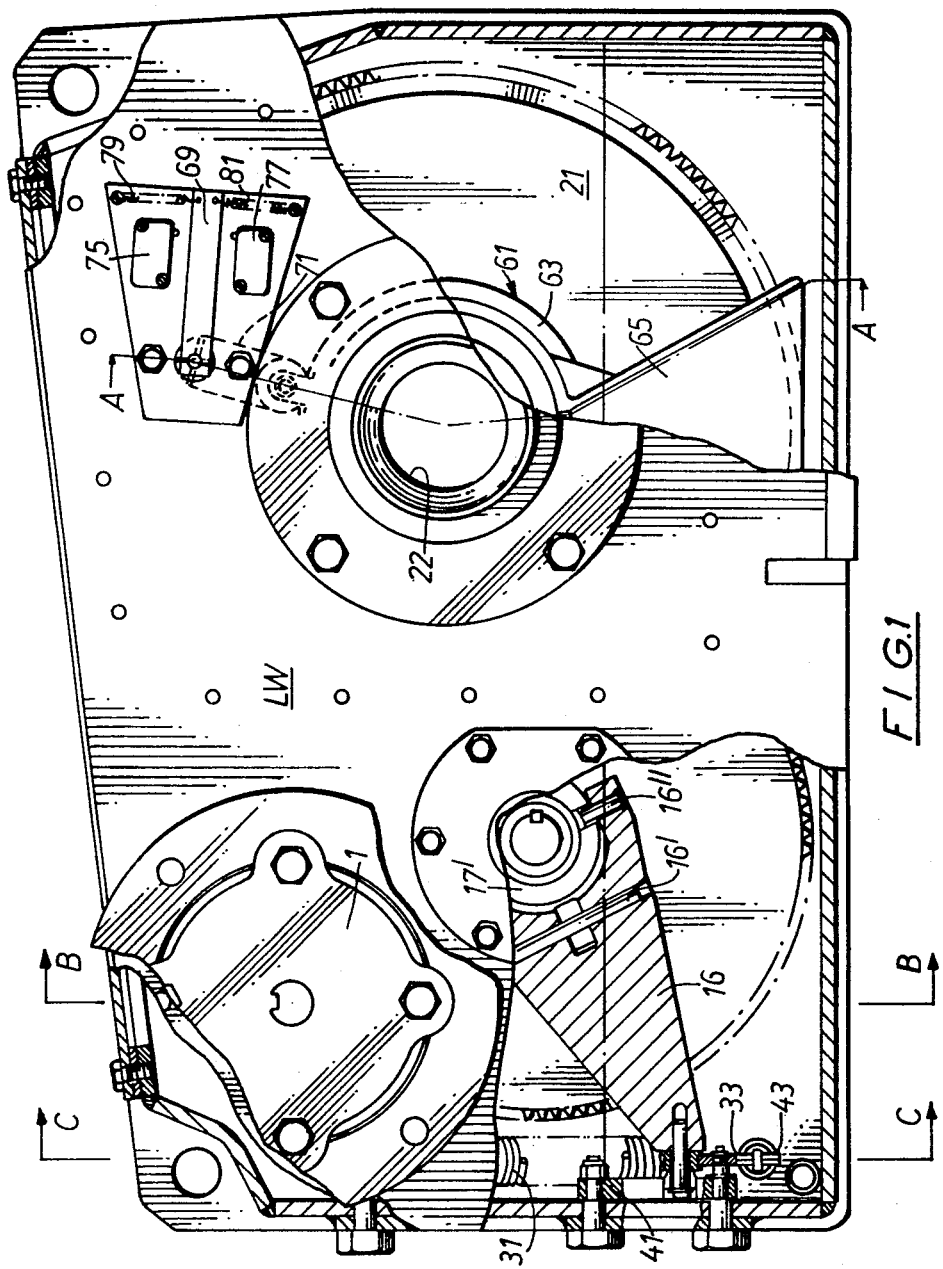
FIG. 1 is a side elevation of the embodiment with parts broken away to reveal otherwise hidden detail.
Figure 2:
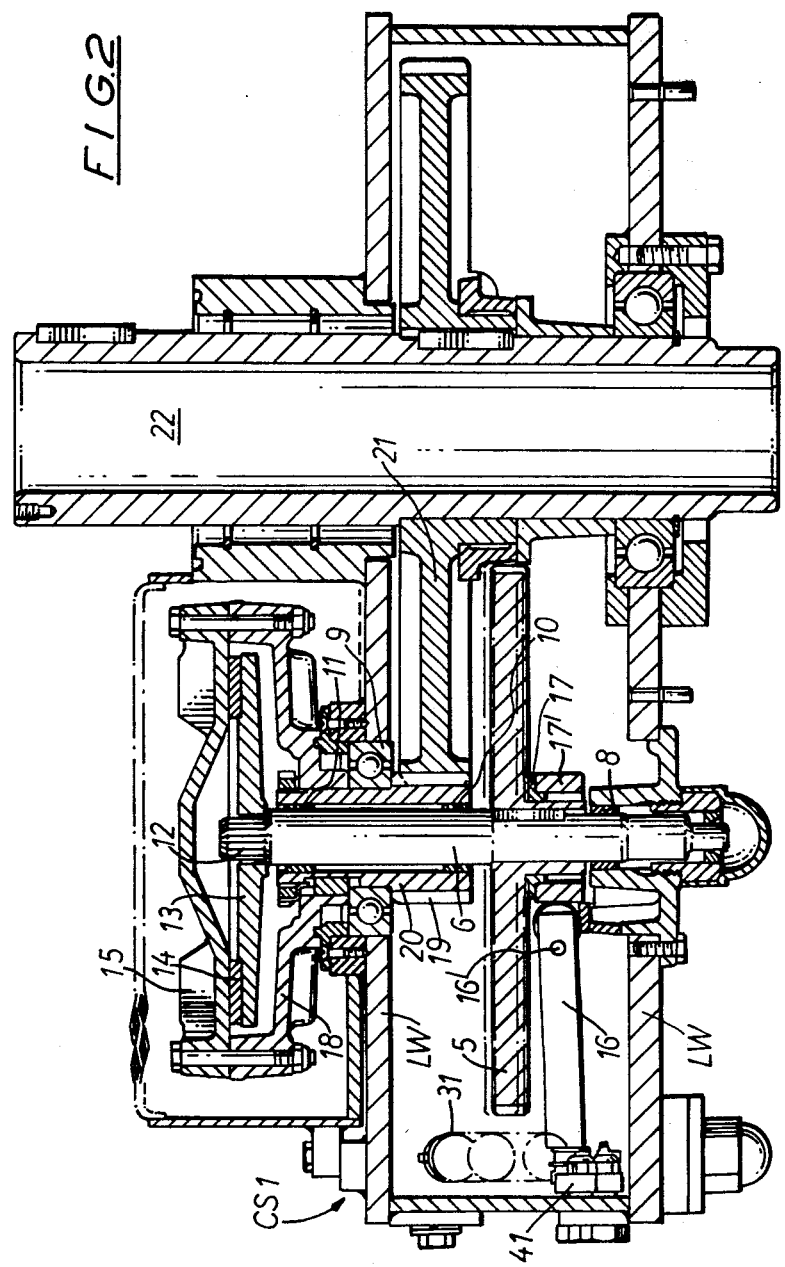
FIG. 2 is a horizontal section through the embodiment.
Figure 3:
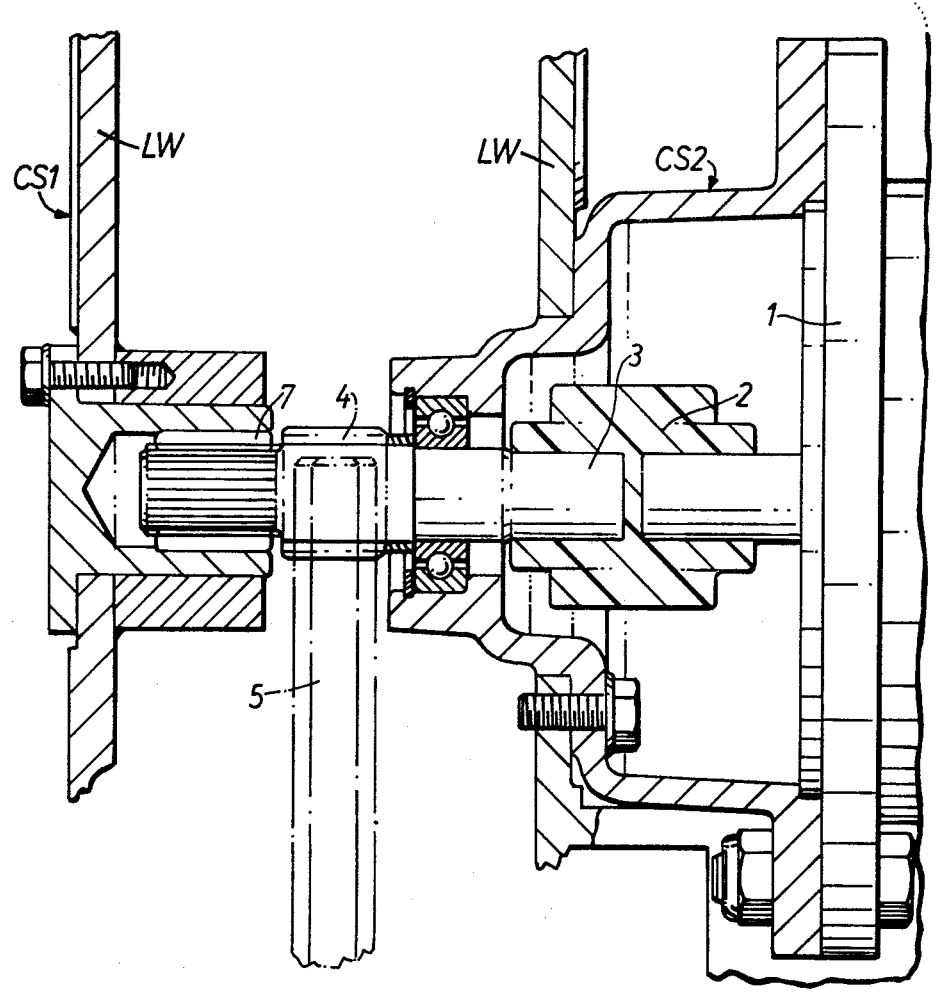
FIG. 3 is a section on the line B—B of FIG. 1.

Referring now to FIGS. 1 to 3, the winding mechanism of the embodiment comprises a casing generally indicated at CS1 providing lateral walls LW mounting therebetween and thereon various parts of the mechanism.

One of the lateral walls has mounted on the exterior face thereof an electric motor 1 (FIG. 3), providing motive power for the winding mechanism via a coupling 2 housed within a casing CS2 mounting the electric motor. The coupling drives a first motion shaft 3 supported at its respective ends in bearings respectively mounted in the casing CS2 and in a one way clutch 7 carried in the opposing lateral wall of casing CS1. In accordance with the invention, the shaft 3 is formed with a gear pinion 4 meshing with a gear wheel 5 carried by a second, and axially displaceable, shaft 6 the axis of which lies parallel with that of the first motion shaft 6. The shaft is supported directly by needle roller bearings 8, 10 and 11, so as to permit the axial displacement to be effected. It is also supported indirectly by ball bearing 9. The upper end of the shaft 6 as seen in FIG. 2 is formed with splines 12 which rotationally drive a splined disc 13. Further in accordance with the invention, the disc carries a friction ring or disc 14 constituting the input member of a slippable friction clutch, the output member of which is formed by an outboard casing member 15; the input member being resiliently biassed into engagement with the output member by a displacement means comprising in this instance a lever 16 pivoted at 16' to act at one end thereof against a thrust bearing 17, fixed on an extension of gear wheel 5; the lever end acting via pins, one of which 16'' is seen to FIG. 1, carried by the lever at said end thereof and engaged with a ring 17' displaceable against the thrust bearing 17.

The outboard casing part is fastened to an inboard casing part 18 mechanically connected to a gear pinion 19 carried by a third motion shaft 20. The pinion engages a gear wheel 21 mounted on a hollow spindle 22 onto which a cable reel (not shown) is mounted. The gear wheels 5 and 21 are enclosed by casing parts and, in use, are immersed in lubricant.

It is a feature of the illustrated embodiment that the lever 16 is resiliently biassed, in this instance, by a pair of springs 31 (see especially FIG. 4) via a mechanism constituting a means of maintaining the force applied to the lever 16 to compensate for wear of the clutch members and avoid a change, consequential upon such wear, in the torque that can be transmitted by the slippable clutch. The mechanism also constitutes a means of setting, for any given condition of the clutch, the torque that can be transmitted thereby. The mechanism comprises an operating lever 33 through which spring tension is applied to the remote end of lever 16; the letter carrying a roller 35 for engagement by a cam surface, in the form of a ramp 37, formed on lever 33. The lever 16 also carries a further roller 39 coaxially with roller 35, guided in a rectilinear slot S closed at one end and formed in a fixed member 41 of the winding mechanism. The lever 33 is itself acted on by an actuating member 43 in the form of a cranked lever one end of which is pivotally anchored by an anchor plate 45 to one end of the springs, and the other end of which is connected to a manually settable displacement device 47 for the cranked lever; the cranked lever bearing at the crank, a roller 49 to engage on the underside of operating lever 33. The two springs are also pivotally connected to an anchor plate 51 at their other ends; the anchor plate being pinned to a part of the casing CS1. Tension in the springs is transmitted through the cranked lever to the operating lever 33, from the latter to lever 16 and, via the thrust bearing 17 and shaft 6, from lever 16 to the clutch input member.

Figure 4:
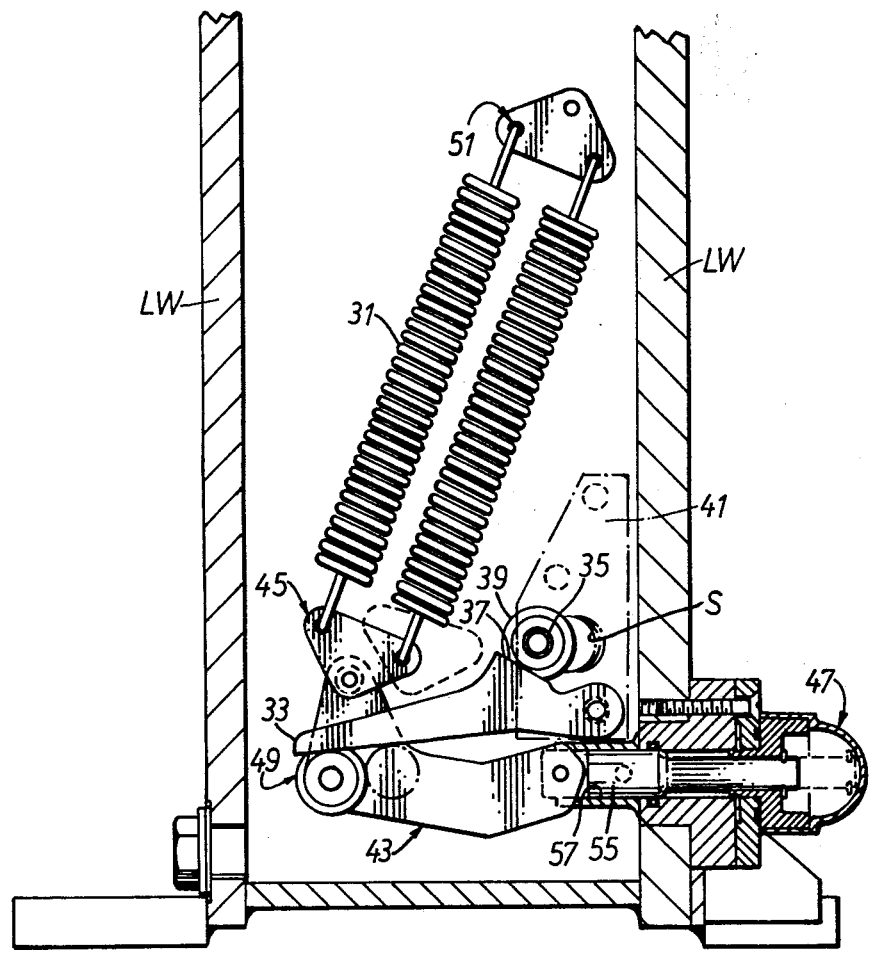
FIG. 4 is a section on the line C—C of FIG. 1.

The settable displacement device 47 comprises a nut 53 engaged on the shank of a screw 55 carried in a screw threaded bore 57 formed in the nut, which is axially fixed. By rotating the nut to screw the shank in or out, the point along the underside of lever 33 against which the roller of the cranked lever bears i.e. the length of the lever arm, can be altered while simultaneously altering the spring extension i.e. as the spring extension increases, the lever arm increases and conversely as the spring contracts the effective length of the lever arm reduces. This not only permits, for any given clutch condition, the torque to be sustained by the clutch, to be set, but also permits automatic compensation for clutch wear. Thus, when clutch wear takes place, the cranked lever is pivoted under spring tension to pivot the operating lever and cause the ramp surface thereof to displace the roller 39 to the right, as seen in FIG. 4, in the slot by an amount in relation to the fulcrum of lever 33 and the displacement of roller 49 of the actuating member 43 such as to increase the lever arm exerted through lever 33, thereby to maintain the torque capacity of the clutch.

It will be evident from the above that, as wear takes place, the guide roller 35 moves inwardly of the slot until finally encountering the closed end thereof. At this point, no further compensation can be effected and the clutch input member would need to be replaced. It will also be understood that, in this instance, screwing screw 55 inwardly increases spring extension and the lever arm and thereby the torque that can be transmitted, while screwing it outwardly produces the opposite effect.

Figure 5:
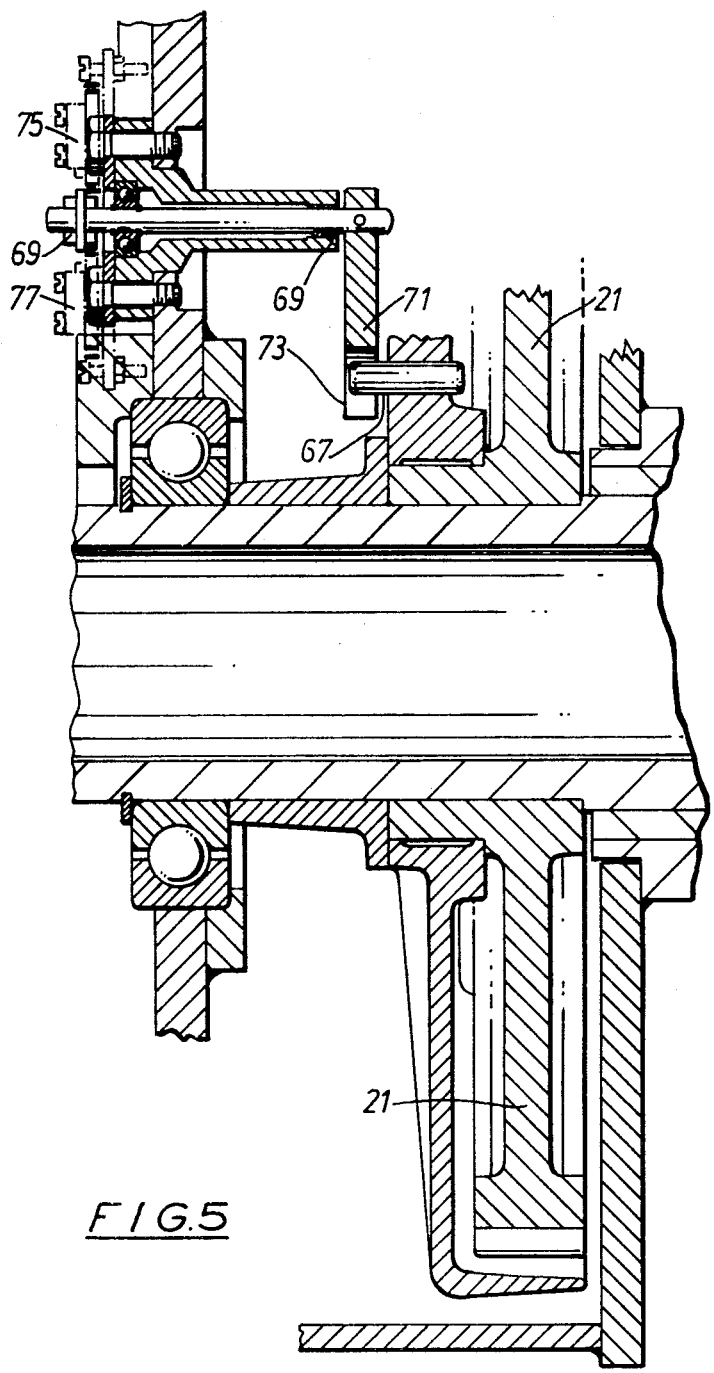
FIG. 5 is a section on the line A—A of FIG. 1.

It is a further feature of the illustrated embodiment that the winding mechanism also comprises means for sensing the direction of rotation of the cable drum. In one form, the means comprises a paddle 61 (FIGS. 1 and 5) mounted by an annular hub portion 63 on the hollow spindle 22 adjacent the gear wheel 21 to be able to rotate on the spindle, and a radially extending, vaned, paddle portion 65. Diametrically opposite the paddle portion 65, the hub bears a pin 67 extending therefrom in the axial direction, and the pin is linked to a switch actuating bar 69 by a lever 71 providing a bifurcated end 73 to engage the pin. The bar 60 is flanked by two microswitches 75, 77 respectively and is biassed to a position between the two switches by tension springs 79, 81. On rotation of the spindle drive, the lubricant is caused to move, and the drag thereof on the vaned paddle portion displaces the paddle in the direction rotation of the spindle through an arc sufficient to cause the bifurcated lever to displace the switch actuating bar against one or the other of the microswitches to operate the switch. It is here explained that two switches are provided merely to enable the direction of rotation of the winding member in unwinding the cable to be chosen. Once the direction is chosen, the appropriate one of the two switches is then connected in the motor circuit while the other switch is disabled. The microswitch chosen to respond to rotation in the direction of roation of the spindle to unwind the cable, provides a motor stop signal. It may do this simply by opening contacts in the supply circuit to the motor. Thus, when the cable is being pulled off the cable drum under tension, no drive is provided from the electric motor; and the one-way clutch 7 prevents rotation of the clutch input member. As a result, the clutch friction element 14 slips against the clutch output member, which rotates with the gear wheel 21 to provide unwinding of the cable against a controlled resistance.

Figure 6:
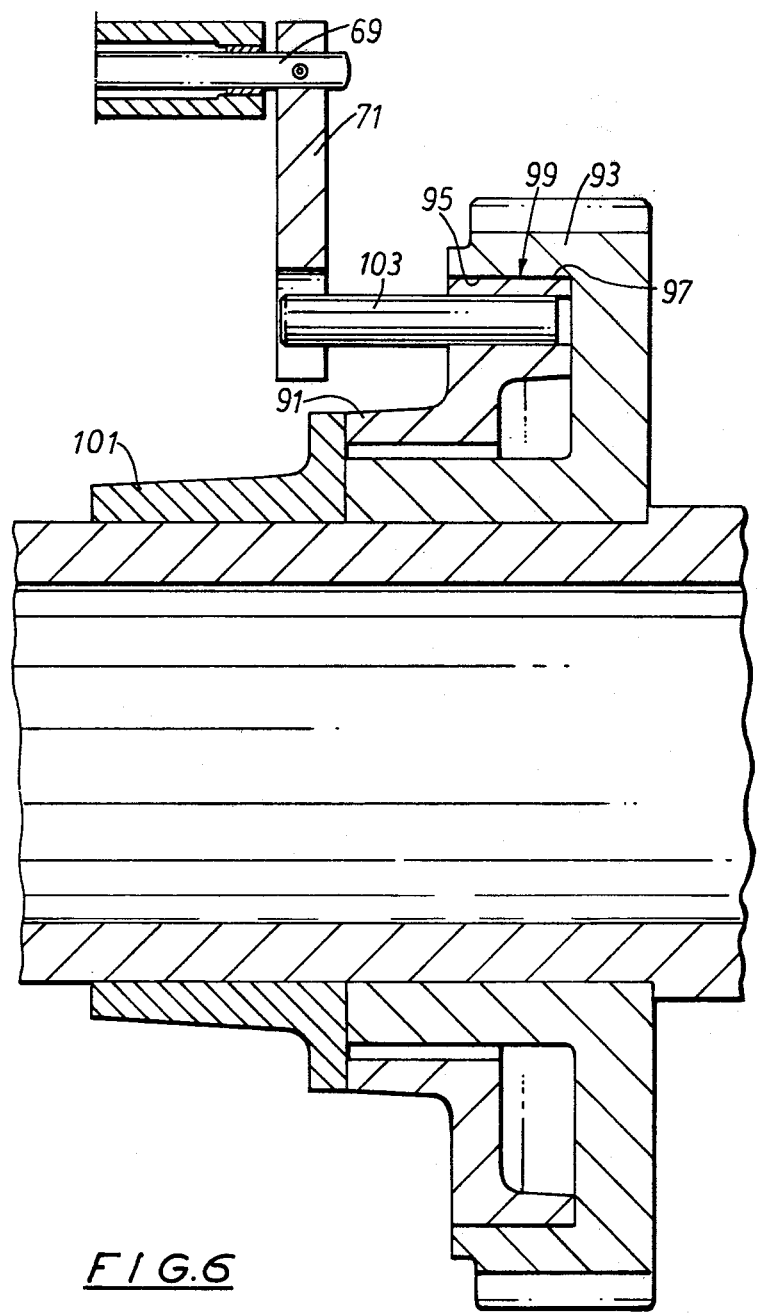
FIG. 6 is a sketch showing a modification of the detail shown in FIG. 5.

In a modification of the above described arrangement (see FIG. 6) the paddle is replaced by a ring 91 The gear wheel 21 comprises a peripheral axially extending annular flange 93 providing a radially inwardly disposed circumferential surface 95, and the ring provides a radially outwardly disposed circumferential surface 97. The ring is mounted within the flange 93 with its surface 97 facing surface 95 of the flange and is dimensioned so that a gap 99, filled with lubricant, is left between the two surfaces. Axial displacement of the ring is prevented by a collar 101 mounted on spindle 21. On rotation of the spindle, the viscous drag of the lubricant displaces the ring through an arc in a similar manner to the displacement of the paddle, and the displacement is transmitted to the lever 71 and bar 69, again by a pin 103 entered into an axial bore in the ring. The ring may be made of aluminium and thus have a different co-efficient of thermal expansion than gear wheel 21, which usually will be made of steel, so that the gap will vary in width inversely with temperature, to compensate for lubricant viscosity changes with temperature.

In operation of the device, the spur gear constituted by the pinion 4 and gear wheel 5, permits axial displacement of the latter while still transmitting torque. The displacement of shaft 6 required to enable the slippable clutch to transmit the torque required is, therefore, accommodated by displacement of gear wheel 5 but without impairing the ability of the spur gear to transmit the torque from the motor. Further, the spur gear is more efficient than a wheel and worm drive and thereby avoids the difficulties of lubricant temperature arising with such a drive as described above.

The torque transmitted by the clutch may readily be controlled within the wear life of the friction lining 14 by the above described means; and control of the electric motor is efficaciously provided for by the rotation sensing means.

I claim:

1. A winding mechanism for winding up a cable comprising means for taking on and paying off the cable, said means having a winding member on which the cable is wound up and from which the cable can be wound off, and one-way drive means for applying torque to the winding member to rotate the latter to wind up the cable; said drive means comprising (A) a slippable friction clutch having an input member and an output member one of which members is axially displaceable relative to the other member (B) a gear wheel arrangement comprising a driving gear wheel and, meshing therewith, a driven gear wheel; one of said gear wheels being axially displaceable in relation to the other of the gear wheels while still permitting torque to be transmitted by the gear wheels, and the displaceable gear wheel being connected to the displaceable clutch member to rotate and to undergo axial displacement therewith; and (G) means for effecting axial displacement of the displaceable clutch member relative to the other clutch member in order to maintain a driving connection between the clutch input and output members.

2. A winding mechanism according to claim 1, wherein the drive means comprises a motive power unit providing drive via a one-way clutch to prevent drive of the clutch input member in the direction of rotation of the winding member to unwind the cable.

3. A winding mechanism according to claim 1, further comprising means for sensing the direction of rotation of said winding member and providing a signal, hereinbelow called the stop signal, when and for as long as the direction is contrary to that of wind up, for stopping drive to the clutch input member; said means responding to viscous drag of lubricant.

4. A winding mechanism according to claim 3, wherein said sensing means comprises a displaceable member arranged in relation to a rotating part of said take-up and pay-off means so that rotation of said part causes displacement in a given direction of said member by the effect thereon of the viscous drag of lubricant between the member and said part.

5. A winding mechanism according to claim 4, wherein said member and said part each comprises an annular form arranged co-axially of one another.

6. A winding mechanism according to claim 5 wherein said member comprises a vaned, radially extending paddle; the lubricant acting against the paddle to cause displacement of the member.

7. A winding mechanism according to claim 5, wherein said rotating part and said member provide opposed concentrically arranged circumferential surfaces spaced sufficiently closely so that lubricant drag between the rotating part and the member causes, on rotation of the rotating part, rotational displacement of the members in the direction of rotation of the rotating part.

8. A winding mechanism according to claim 1, wherein said displaceable clutch member is the clutch input member.

9. A winding mechanism according to claim 8, wherein said displaceable gear wheel is the driven gear wheel.

10. A winding mechanism according to claim 9, wherein the clutch input member is mounted on an axially displaceable shaft and the driven gear wheel is mounted on the shaft to effect rotation thereof.

11. A winding mechanism according to claim 10, wherein the shaft is directly supported in needle roller bearings.

12. A winding mechanism according to claim 10, wherein said means for effecting displacement of the clutch input member comprises a lever pivoted so that on pivoting of the lever one end thereof is translated generally in the direction of displacement of said clutch input member, and means for transmitting movement of that end of the lever to the clutch input member.

13. A winding mechanism according to claim 12, wherein said movement of said one end of the lever is transmitted to the shaft and thereby to the clutch input member by means of a thrust bearing carried by said shaft.

14. A winding mechanism according to claim 12, wherein said lever is resiliently biassed in a direction to displace the input member of the clutch in the direction towards the clutch output member.

15. A winding mechanism according to claim 14, wherein the resilient bias is provided by one or more tension springs.

16. A winding mechanism according to claim 15, wherein said spring or each of them is associated with means for maintaining the leverage exerted by the spring or springs with clutch wear so that the capacity of the clutch to transmit torque can be sustained.

17. A winding mechanism according to claim 16 wherein said maintaining means comprises an operating lever, a cam surface formed thereon, said lever being pivoted at one end and acting intermediate its ends by means of said cam surface on said lever of the displacement means at a location on that lever remote from said one end thereof, and an actuating member through which resilient bias can be applied to said operating lever at a predetermined lever arm; whereby, with clutch wear, the resilient bias pivots the actuating member to pivot the operating lever to cause the cam surface thereof to displace the lever of the displacement means so that the lever arm exerted through the operating lever increases to maintain the capacity of the clutch to transmit torque.

18. A winding mechanism according to claim 17, wherein the actuating member is adjustable in position so that it can be adjusted to shorten or lengthen the spring extension and correspondingly the lever arm, whereby, for any given clutch wear condition, the maintaining means also constitutes a means to set a predetermined torque to be transmitted by the clutch, by shortening or lengthening the spring extension and lever arm as the case may be.

19. A winding mechanism for winding up a cable, comprising means for taking up and paying off the cable, the means comprising a winding member on which cable is wound up and from which cable can be wound off, and one-way drive means for applying torque to the winding member to rotate the latter to wind up the cable; said take-up and pay-off means comprising a lubricated means for sensing the direction of rotation of said winding member and providing a signal, hereinbelow called the stop signal, when and for as long as the direction is contrary to that of wind up, for stopping drive to the winding member; said sensing means responding to viscous drag of the lubricant.

20. A winding mechanism according to claim 19, wherein said sensing means comprises a displaceable member arranged in relation to a rotating part of said take-up and pay-off means so that rotation of said part causes displacement in a given direction of said member the the effect thereon of the viscous drag of lubricant between the member and said part.

21. A winding mechanism according to claim 20, wherein said displaceable member is linked to the actuator of a switch to operate the switch on displacement of the displaceable member to provide the stop signal.

22. A winding mechanism according to claim 21, wherein two switches are employed, each to provide a stop signal on actuation, and are arranged so that when the rotation of the winding member on unwinding of the cable is in one direction one of the switches is actuated, and when that rotation is in the opposite direction, the other switch is actuated; the switch not to be operated for the chosen direction of rotation being disabled.

23. A winding mechanism according to claim 22 wherein the link is resiliently biassed to assume a position out of contact with a switch actuator when the displaceable member has not been displaced.

24. A winding mechanism according to claim 20, wherein said member and said part each comprise an annular form arranged co-axially of one another.

25. A winding mechanism according to claim 24, wherein said member comprises a vaned, radially extending, paddle; the lubricant acting against the paddle to cause displacement of the member.

26. A winding mechanism according to claim 24, wherein said rotating part and said member provide opposed concentrically arranged circumferential surfaces spaced sufficiently closely so that lubricant drag between the rotating part and the member causes, on rotation of the rotation part, rotational displacement of the member in the direction of rotation of the rotating part.

27. A winding mechanism according to claim 26, wherein said rotating part and said displaceable member are made of materials of different co-efficient of thermal expansion so that the spacing between them varies inversely with temperature to compensate for changes in lubricant viscosity with temperature.

28. A winding mechanism for winding up a cable, comprising means for taking on and paying off the cable, said means having a winding member on which the cable is wound up and from which it can be wound off, and one-way drive means for driving the winding member in the direction to wind up the cable thereon; said drive means comprising
    (A) an electric motor,
    (B) a reduction gear connected to the motor to be driven thereby and reduce the motor speed,
    (C) a slippable friction clutch comprising an input member and an output member, the input member being axially displaceable relative to the output member
    (D) means for resiliently biassing the clutch input member against the clutch output member; and
    (E) means for maintaining the leverage to be exerted by the resilient bias with clutch wear so that the capacity of the clutch to transmit torque can be sustained wherein said maintaining means comprises an operating lever, a cam surface formed thereon, said lever being pivoted at one end and acting intermediate its ends by means of said cam surface on a lever pivotally acting at one end on the clutch input member to form displacement means therefor, and an actuating member through which resilient bias can be applied to said operating lever at a predetermined lever arm; whereby, with clutch wear, the resilient bias pivots the actuating member to pivot the operating lever to cause the cam surface thereof to displace the lever of the displacement means so that the lever arm exerted through the operating lever increases to maintain the capacity of the clutch to transmit torque.

29. A winding mechanism according to claim 28, wherein the lever of said displacement means is guided at the end remote from said one end by a rectilinear guide.

30. A winding mechanism according to claim 29, wherein the rectilinear guide is in the form of a slot.

31. A winding member according to claim 29, wherein said remote end of the lever of said displacement means bears a roller and is guided in said guide by the roller.

32. A winding mechanism according to claim 28, wherein the actuating member is adjustable in position so that it can be adjusted to shorten or lengthen the lever arm, whereby, for any given clutch wear condition, the maintaining means also constitutes a means to set a predetermined torque to be transmitted by the clutch, by shortening or lengthening the spring extension and lever arm as the case may be.

33. A winding mechanism according to claim 32 wherein said means for resiliently biassing the clutch input member comprises spring means, said actuating member being adjustable in position to adjust the length of said spring means and, correspondingly, said lever arm.

34. A winding mechanism according to claim 32, wherein the maintaining means comprises a manually settable displacement device for effecting adjustment of the position of the actuating member.

35. A winding mechanism according to claim 34, wherein the actuating member is in the form of a cranked lever to one end of which the resilient bias means is pivotally connected and the other end of which is pivotally connected to said displacement device.

36. A winding mechanism according to claim 34, wherein the settable displacement device comprises a screw secured in a screw-threaded bore of an axially fixed nut so that rotation of the nut displaces the screw axially, thereby to displace said actuating member.

* * * * *